United States Patent
Lee

(10) Patent No.: US 8,411,163 B2
(45) Date of Patent: *Apr. 2, 2013

(54) AUTO EXPOSURE CONTROLLING DEVICE AND METHOD

(75) Inventor: Sang Yong Lee, Seoul (KR)

(73) Assignee: LG Innotek Co., Ltd., Seoul (KR)

(*) Notice: Subject to any disclaimer, the term of this patent is extended or adjusted under 35 U.S.C. 154(b) by 105 days.

This patent is subject to a terminal disclaimer.

(21) Appl. No.: 12/948,415

(22) Filed: Nov. 17, 2010

(65) Prior Publication Data

US 2011/0058066 A1   Mar. 10, 2011

Related U.S. Application Data

(63) Continuation of application No. 11/861,818, filed on Sep. 26, 2007, now Pat. No. 7,859,577.

(30) Foreign Application Priority Data

Sep. 26, 2006 (KR) .................. 10-2006-0093579

(51) Int. Cl.
- *H04N 5/235* (2006.01)
- *H04N 3/14* (2006.01)
- *H04N 5/335* (2011.01)
- *G05B 13/02* (2006.01)

(52) U.S. Cl. .............. 348/229.1; 348/297; 700/41

(58) Field of Classification Search ........... 348/229.1, 348/230.1, 297, 221.1, 241; 700/41
See application file for complete search history.

(56) References Cited

U.S. PATENT DOCUMENTS

| 5,029,066 A | 7/1991 | Hiroi |
| 7,256,384 B2 | 8/2007 | Gottesman et al. |
| 2004/0017485 A1 | 1/2004 | Ohishi |
| 2004/0065821 A1 | 4/2004 | Warren et al. |
| 2004/0169746 A1 | 9/2004 | Chen et al. |
| 2006/0056831 A1 | 3/2006 | Horio et al. |

FOREIGN PATENT DOCUMENTS

| JP | 11-168655 A | 6/1999 |
| JP | 2005-021445 A | 1/2005 |
| JP | 2005-260455 A | 9/2005 |
| KR | 10-2006-0087661 A | 8/2006 |

OTHER PUBLICATIONS

Office Action dated May 17, 2011 in Japanese Application No. 20070250232, filed Sep. 26, 2007.

*Primary Examiner* — Daniel M Pasiewicz
(74) *Attorney, Agent, or Firm* — Saliwanchik, Lloyd & Eisenschenk

(57) ABSTRACT

An automatic exposure (AE) controlling device and method are provided. According to the method, an electric shutter (ES) value and an analog gain control (AGC) value can be calculated through a proportional integral control method according to a brightness value of an inputted image frame. Then, AE compensation on a present image frame can be performed using the calculated ES value and AGC value.

24 Claims, 5 Drawing Sheets

FD: Feedback Value
CV: Control Value
F: Each Frame

AUTO EXPOSURE CONTROLLING DEVICE AND METHOD

CROSS-REFERENCE TO RELATED APPLICATIONS

This application is a continuation of U.S. application Ser. No. 11/861,818, filed Sep. 26, 2007, now U.S. Pat. No. 7,859,577, issued Dec. 28, 2010, which claims the benefit under 35 U.S.C. §119 of Korean Patent Application No. 10-2006-0093579, filed Sep. 26, 2006, which is hereby incorporated by reference in its entirety.

BACKGROUND

High-level automatic control technology is often applied to industrial robots and machine tools to improve their performance. Examples of automatic control technology include an open loop system and a closed loop system.

In an open loop system, such as a non-feedback system, a sequence control is typically used. This non-feedback system is not often used, though. A closed loop system, such as a feedback system, can be expensive, but is often used in industries due to the ability to accurately compensate for a present value.

A feedback system generally includes a proportional controller, an integral controller, a proportional integral controller, a proportional derivative integral controller, a fuzzy controller, and a fuzzy proportional derivative integral controller. A controller can be used according to system properties, depending on which controller is appropriate. A proportional integral controller and a proportional derivative controller are most often used.

A proportional integral control method is typically used in a non-motorized system. This method has advantages in improving a response time of the system, preventing excessive overshoot, and enhancing stability.

In order to control automatic exposure (AE) of a camera module, a device includes digital control technology to maintain the brightness of an image in the optimized state regardless of the illumination of a light source.

An AE controlling function automatically controls the brightness of an image by considering the light intensity of a subject and its surroundings, and the reflectivity of the subject.

For a digital camera module, an AE algorithm is often implemented in an image signal processor (ISP) to perform the AE controlling function. The AE controlling function adjusts the brightness level of the subject for each input image frame in correspondence to the illumination change around the subject and the brightness of the subject.

A related art AE algorithm processes feedback signal data before an AE compensation control in an aspect of a signal process. Therefore, this is limited to only compensating for a difference of a target brightness value and a present brightness value.

The related art AE algorithm writes an electrical shutter (ES) value and an automatic gain control (AGC) value with respect to the various brightness values in a database through a great number of experiments. Then, when performing AE compensation, the ES value and the AGC value that correspond to the processed present brightness data are utilized through image signal processing.

However, according to this related art method, memory usage in the ISP increases. Also, it takes a relatively long time to develop various algorithms, and malfunctions often occur in unexpected environments.

Furthermore, AE accuracy is limited because the time for processing an image signal is not taken into consideration.

Thus, there exists a need in the art for an improved device and method for controlling AE.

BRIEF SUMMARY

Embodiments of the present invention provide a device and a method for controlling automatic exposure (AE) by using a proportional integral control method.

Embodiments of the present invention also provide a device and a method for controlling AE by correcting hunting due to feedback delay.

In an embodiment, an auto exposure controlling method can include: calculating an electric shutter (ES) value through a proportional integral control method according to a brightness value of an inputted image frame; calculating an analog gain control (AGC) value through the proportional integral control method according to a brightness value of an inputted image frame; and performing AE compensation on a present image frame using the calculated ES value and the calculated AGC value.

In an embodiment, an auto exposure control device can include: an image sensor for converting light intensity of an incident image into an analog image signal; an analog front end (AFE) for receiving the analog image signal to convert the analog image signal into a digital image signal, and for controlling operations of the image sensor; and a controller for calculating an ES value and an AGC value by using a proportional integral control method according to a brightness value of an inputted image signal from the AFE, and for controlling an exposure time of the image sensor and an analog gain of the AFE.

The details of one or more embodiments are set forth in the accompanying drawings and the detailed description below. Other features will be apparent to one skilled in the art from the detailed description, the drawings, and the appended claims.

DETAILED DESCRIPTION

Figure 1:
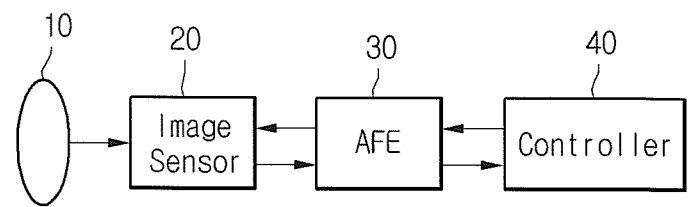
FIG. 1 is a block diagram of an AE controlling device.

Referring to FIG. 1, an automatic exposure (AE) controlling device can include a lens 10 through which an image can enter, an image sensor 20 which can convert light incident through the lens 10 into an analog image signal (such as an electrical signal), an analog front end (AFE) 30 which can receive the analog image signal from the image sensor 20 and can convert it into a digital image signal, and a controller 40 which can process the digital image signal from the AFE 30 for outputting and controlling the AFE 30. The AFE 30 can also be used in controlling the image sensor 20.

The image sensor 20 can be, for example, a complementary metal oxide semiconductor (CMOS) image sensor or a charge coupled device (CCD) image sensor.

The AFE 30 can include, for example, an analog to digital converter (ADC). The AFE 30 can convert the analog image signal outputted from the image sensor 20 into a digital image signal and can provide it to the controller 40.

Additionally, the AFE 30 can generate various clocks, for example, HSync, YSync, and timing generator (TG), to drive the image sensor 20.

The AFE 30 can adjust an analog gain of the analog image signal through control of the controller 40.

The controller 40 can include, for example, an image signal processor (ISP) and a micro controller unit (MCU).

The controller 40 can convert digital data, which can be inputted from the AFE 30 through the ISP, into YCrCb (luminance and chrominance) data and can detect the brightness of the inputted image signal. Additionally, the controller 40 can perform digital gain control with respect to the image signal through the ISP.

The controller 40 can perform automatic exposure (AE), auto white balance (AWB), and auto focus (AF) through the MCU. The controller 40 can also output automatic exposure (AE), auto white balance (AWB), and auto focus (AF) as image data.

The controller 40 can control exposure time of the image sensor 20 and analog gain of the AFE 30 to compensate image brightness for outputting.

The controller 40 can calculate an electric shutter (ES) value for controlling an exposure delay time of the image sensor 20 and an analog gain control (AGC) value for controlling analog gain of the AFE 30. The controller can calculate an ES value and an AGC value through, for example, a proportional integral method to perform an AE control.

When performing the AE control, the ES value and the AGC value can be applied in consideration of a noise component's influence.

That is, if image brightness were to be increased by reducing the ES value, the noise component may not change, but if image brightness were to be increased by enhancing the AGC value, the noise component may be amplified, such that image quality can be deteriorated.

Accordingly, in an embodiment, when performing the AE control to increase the image brightness, the ES value can be adjusted first before adjusting the AGC value. When performing the AE control to decrease the image brightness, the AGC value can be adjusted first before adjusting the ES value.

The ES value can indicate how long exposure time is delayed, during which electric charges can be accumulated in a pixel of the image sensor 20. Thus, as the ES value increases, time for accumulating the electric charges can decrease. As a result, the brightness value of an image can decrease.

For example, if the ES value is 100, the image sensor 20 can count from 1 to 100 and can then start accumulating electric charges. Accordingly, as the ES value increases, time for accumulating electric charges can decrease.

The AGC value can indicate analog gain of an image signal, and as the AGC value increases, the brightness value can increase.

The ES value and the AGC value can be written in a resister of the AFE 30, and the exposure delay time and the analog gain can be determined according to the values written in the register.

Figure 2:
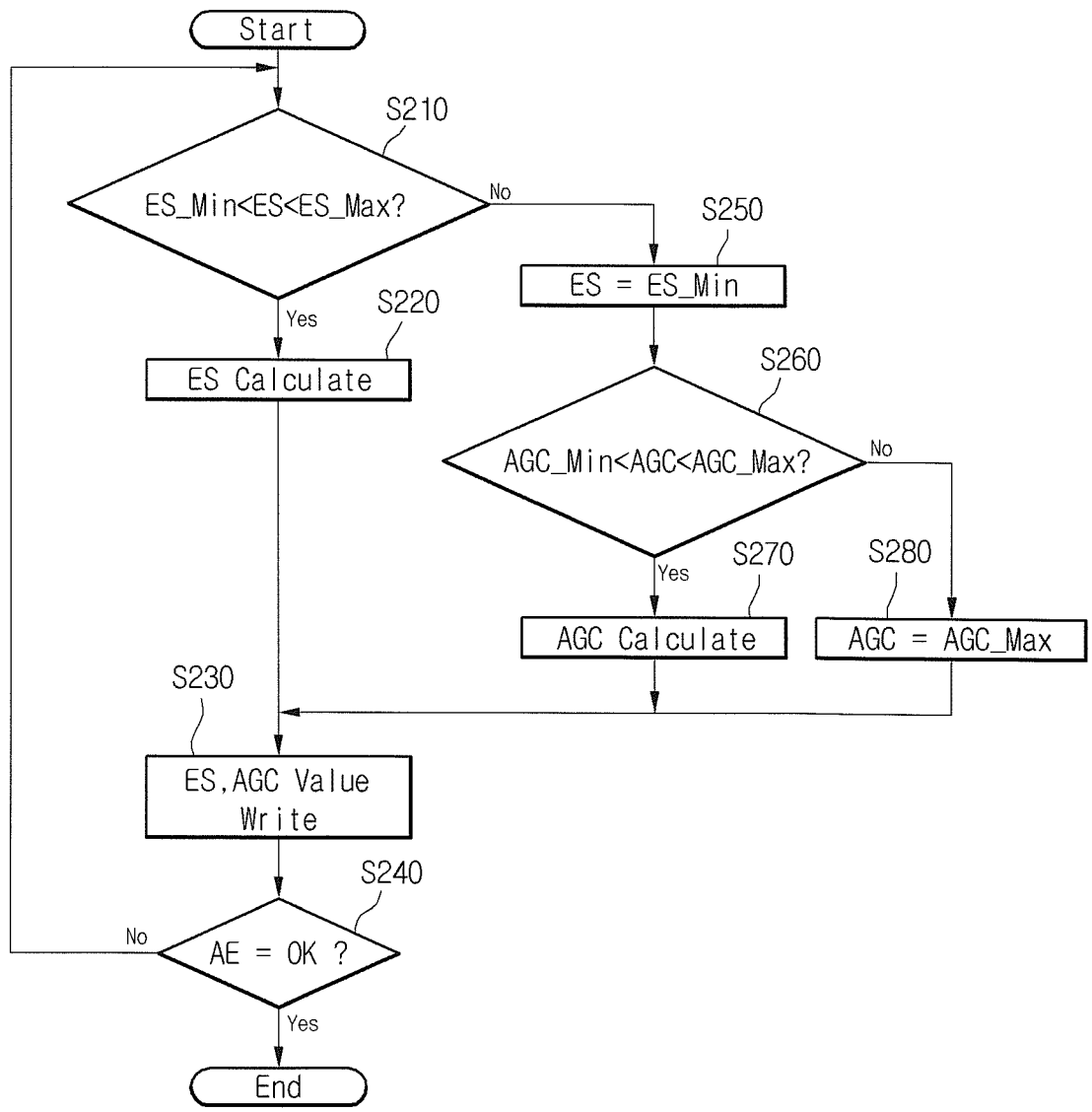
FIGS. 2 and 3 are flowcharts of methods for adjusting an ES value and an AGC value according to an embodiment of the present invention.
Figure 3:
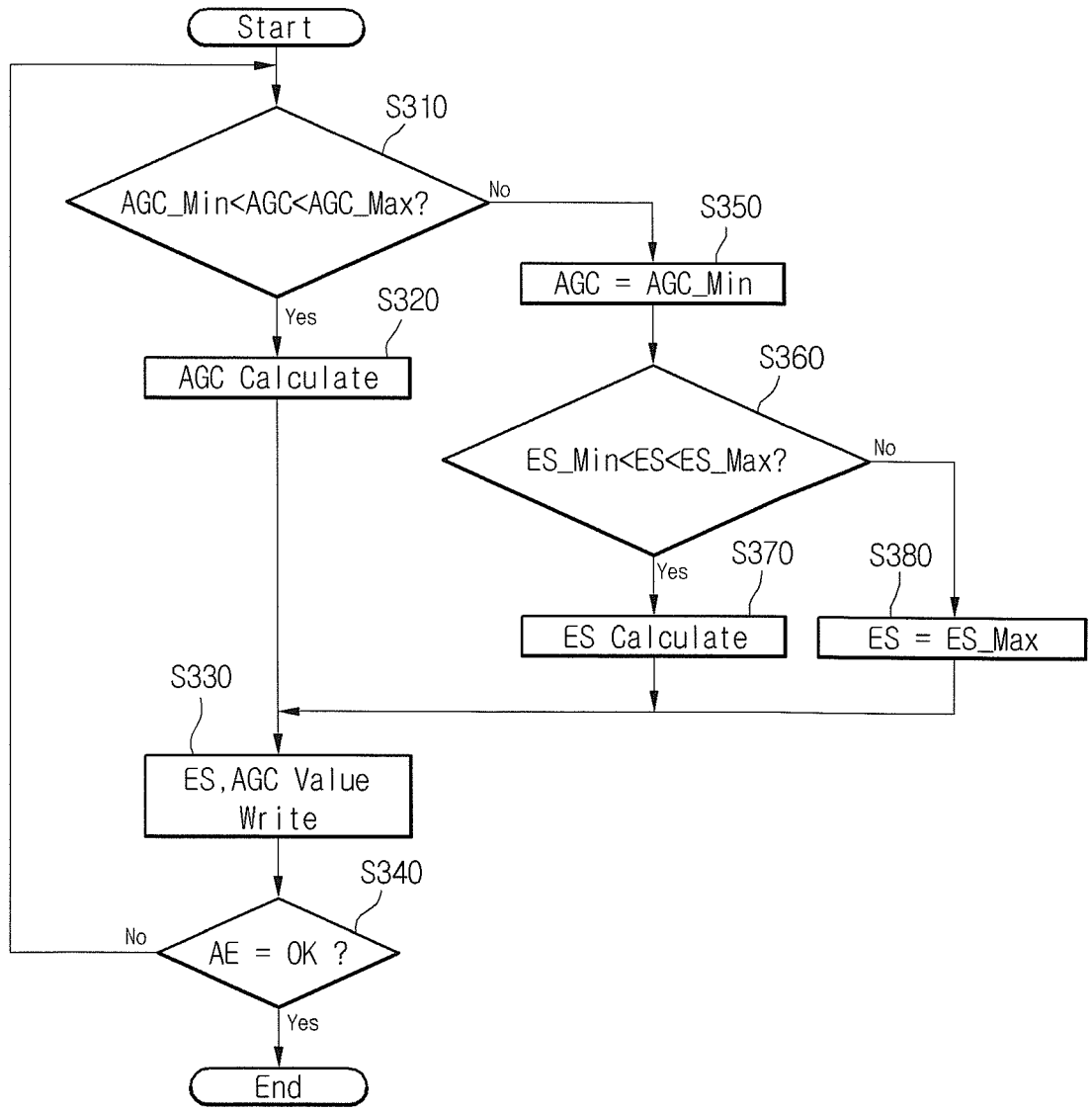

FIGS. 2 and 3 are flowcharts of methods for adjusting an ES value and an AGC value according to an embodiment of the present invention.

A noise component can often be very important in determining the quality of an image. Thus, when performing an AE control to increase image brightness, the ES value, which can have less effect on the noise component, can be adjusted first, and the AGC value can be adjusted only if the ES value is out of range.

Referring to FIG. 2, it can first be determined whether the ES value in the register of the AFE 30 is larger than the adjustable minimum value, ES_Min, and smaller than the adjustable maximum value, ES_Max, in operation S210.

If the ES value is within the range, ES_Min<ES<ES_Max, the ES value for obtaining desirable image brightness can be calculated through a proportional integral control method in operation S220.

If the desirable image brightness can be obtained by only adjusting the ES value, the ES value can be selected as a value larger than ES_Min and less than ES_Max, and then the AE control can be performed using the ES value and the AGC value stored in the AFE 30 in operations S230 and S240.

If the desirable image brightness cannot be obtained by only adjusting the ES value, the ES value can be calculated as ES_Min, and then stored in the register of the AFE 30 in operations S220, S230, and S240.

It can then be determined again whether the ES value is within the range, ES_Min<ES<ES_Max, in operation S210.

Since in this case the ES value is stored as ES_Min (S250), it can be determined whether the AGC value stored in the register of the AFE 30 is larger than the adjustable minimum value, AGC_Min, and less than the adjustable maximum value, AGC_Max, in operation S260.

If the AGC value is within the range, AGC_Min<AGC<AGC_Max, the AGC value for obtaining desirable image brightness can be calculated through a proportional integral control method in operation S270.

If the desirable image brightness can be obtained by adjusting the AGC value in this way, the AGC value can be selected as a value larger than AGC_Min and less than AGC_Max, and then the AE control can be performed using the ES value and the AGC value stored in the AFE 30 in operations S230 and S240.

If the desirable image brightness cannot be obtained by adjusting the AGC value in this way, the AGC value can be calculated as the AGC_Max value, and then stored in the register of the AFE 30 in operations S270, S230, and S240.

In an embodiment, when performing the AE control to increase image brightness, the ES value can be adjusted first to compensate image brightness. When the desirable image brightness cannot be obtained by adjusting only the ES value, the AGC value can be adjusted.

FIG. 3 is a flowchart of an AE control that can reduce image brightness.

Referring to FIG. 3, it can be determined whether the AGC value stored in the register of the AFE 30 is larger than the adjustable minimum value, AGC_Min, and less than the adjustable maximum, AGC_Max, in operation S310.

If the AGC value is within the range, AGC_Min<AGC<AGC_Max, the AGC value for obtaining desirable image brightness can be calculated through a proportional integral control method in operation S320.

If the desirable image brightness can be obtained by only adjusting the AGC value, the AGC value can be selected as a value larger than AGC_Min and less than AGC_Max, and the AE control can be performed using the AGC value and the ES value stored in the AFE 30 in operations S330 and S340.

If the desirable image brightness cannot be obtained by only adjusting the AGC value, the AGC value can be calculated as the AGC_Min value, and then stored in the register of the AFE 30 in operations S320, S330, and S340.

It can then be determined again whether the AGC value is within the range, AGC_Min<AGC<AGC_Max, in operation S310.

Since in this case the AGC value is stored as AGC_Min, it can be determined whether the ES value stored in the register of the current AFE 30 is larger than the adjustable minimum value, ES_Min, and less than the adjustable maximum value, ES_Max, in operations S350 and S360.

If the ES value is within the range, ES_Min<ES<ES_Max, the ES value for obtaining desirable image brightness can be calculated through a proportional integral control method in operation S370.

If the desirable image brightness can be obtained by adjusting the ES value in this way, the ES value can be selected as a value larger than ES_Min and less than ES_Max, and the AE control can be performed using the ES value and the AGC value stored in the AFE 30 in operations S330 and S340.

If the desirable image brightness cannot be obtained by adjusting the ES value in this way, the ES value can be calculated as the ES_Max value, and then stored in the register of the AFE 30 in operations S370, S330, and S340.

In an embodiment, when performing the AE control to reduce image brightness, the AGC value can be adjusted first to compensate the image brightness. If the desirable image brightness cannot be obtained by only adjusting the AGC value, the ES value can be adjusted.

According to an AE control method, when adjusting the ES value and the AGC value, although the image brightness value can be compensated to the target value, it may be uncomfortable to a viewer if the image brightness value is suddenly changed.

Accordingly, while performing AE compensation, the image brightness value should be smoothly changed. To accomplish a smooth transition, a manipulated variable of the ES value and a manipulated variable of the AGC value can be calculated through a proportional integral control method.

The manipulated variable of the ES value and the manipulated variable of the AGC value can be calculated using Equation 1 below.

$$MV_n = MV_{n-1} + \Delta MV_n, \quad (1)$$

where $MV_n$, and $MV_{n-1}$ represent the present manipulated variable and the previous iteration manipulated variable, respectively, and $\Delta MV_n$ represents a derivative of the present manipulated variable.

Each manipulated variable can be calculated through Equation 1.

Here, $\Delta MV$, can be expressed by Equation 2 below.

$$\Delta MV_n = K_p(e_n - e_{n-1}) + K_i e_n, \quad (2)$$

where $K_p$ and $K_i$ represent a proportional control constant and an integral control constant, respectively, $e_n$ represents a deviation of the present manipulated variable, and $e_{n-1}$ represents a deviation of the previous iteration manipulated variable.

In an embodiment, according to the results of a test using Equation 2, the expression can smoothly approach a target value without hunting at $K_p=0.47$ and $K_i=0.55$.

For example, it can be important for an AE algorithm of a mobile camera system to operate at a high speed, but it can be more important for it to converge with no hunting.

However, because the feedback of an image frame brightness value can be delayed even with the proportional integral control through the above Equations 1 and 2, hunting may occur.

Figure 4:
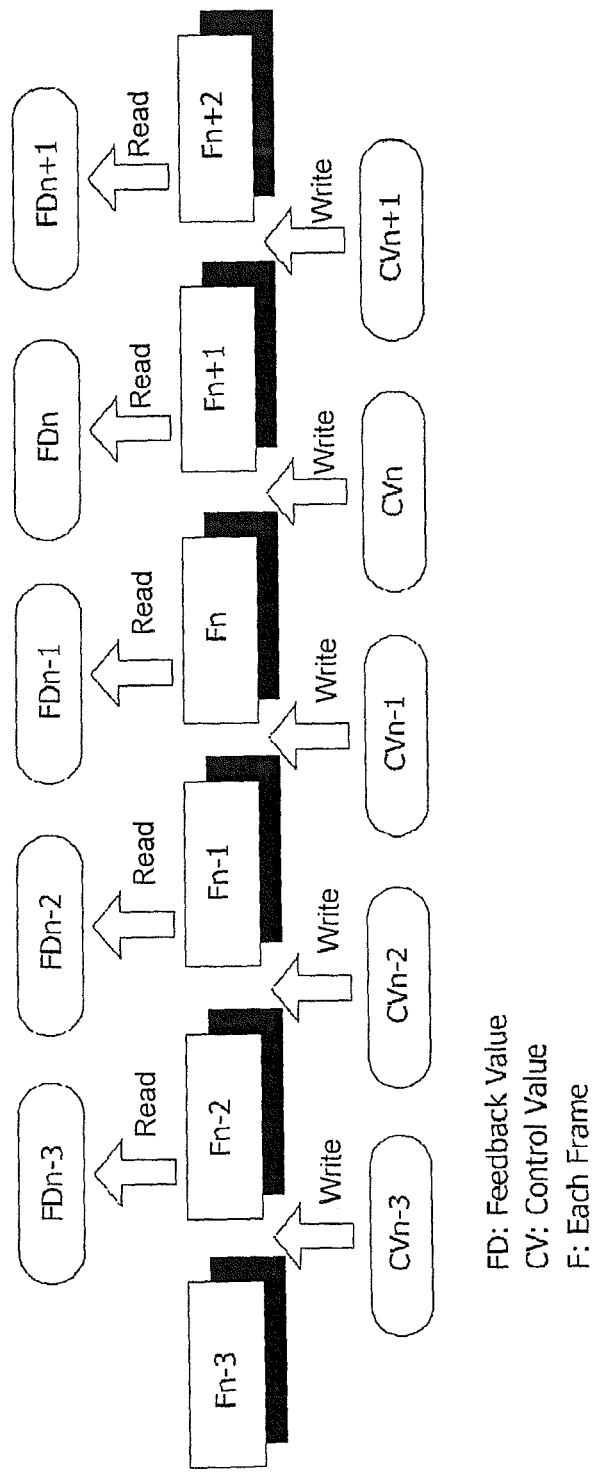
FIG. 4 is a view of feedback delay according to an embodiment of the present invention.

FIG. 4 is a view of feedback delay according to an embodiment of the present invention.

Referring to FIG. 4, FD, CV, and F represent a feedback value, a control value, and an image frame, respectively. The control value (CV) can be, for example, the ES value or the AGC value.

For example, a value $CV_{n-1}$ can be written into a register when a frame $F_{n-1}$ is finished, and the value $CV_{n-1}$ can be applied to a frame $F_{n-2}$. The value $CV_{n-1}$ applied to the frame $F_{n-2}$ can read a value $FD_{n-2}$ when the frame $F_{n-1}$ progresses due to an operation of calculating.

In a typical ISP, if there is a difference after comparing the frame $F_{n-1}$ with a target value, it can compensate the ES value and the AGC value for the difference. As a result, brightness value change of the frame can be the result of the feedback whose brightness value is a value from two frames previous, not the last frame. Due to this property, since the value of two frames previous can become the feedback during the entire AE period, hunting may occur.

According to an embodiment of the present invention, the AE compensation can be performed by considering a delay variable for compensation in the feedback of the image frame brightness value.

The frame delay variable can be reflected through Equation 3.

$$CFD_n = FD_n + \sum_{k=0}^{1} UD_{n-k} - \sum_{k=0}^{1} DD_{n-k}, \quad (3)$$

where CFD and FD represent the final value of feedback and present feedback, respectively, and UD and DD represent a brightness change value when a frame brightness value increases, and a brightness change value when a frame brightness value decreases, respectively.

Through Equation 3, the final value of feedback (CFD) can be the result of when the brightness change value (UD or DD) of the two frames is reflected on the present feedback (FD).

If the brightness value increases, UD data can be reflected and otherwise, DD data can be reflected. Here, UD and DD can be obtained by experiment using expected values of the AGC value and the ES value. Values of UD and DD can be obtained, for example, by the method described with reference to FIG. 5.

Figure 5:
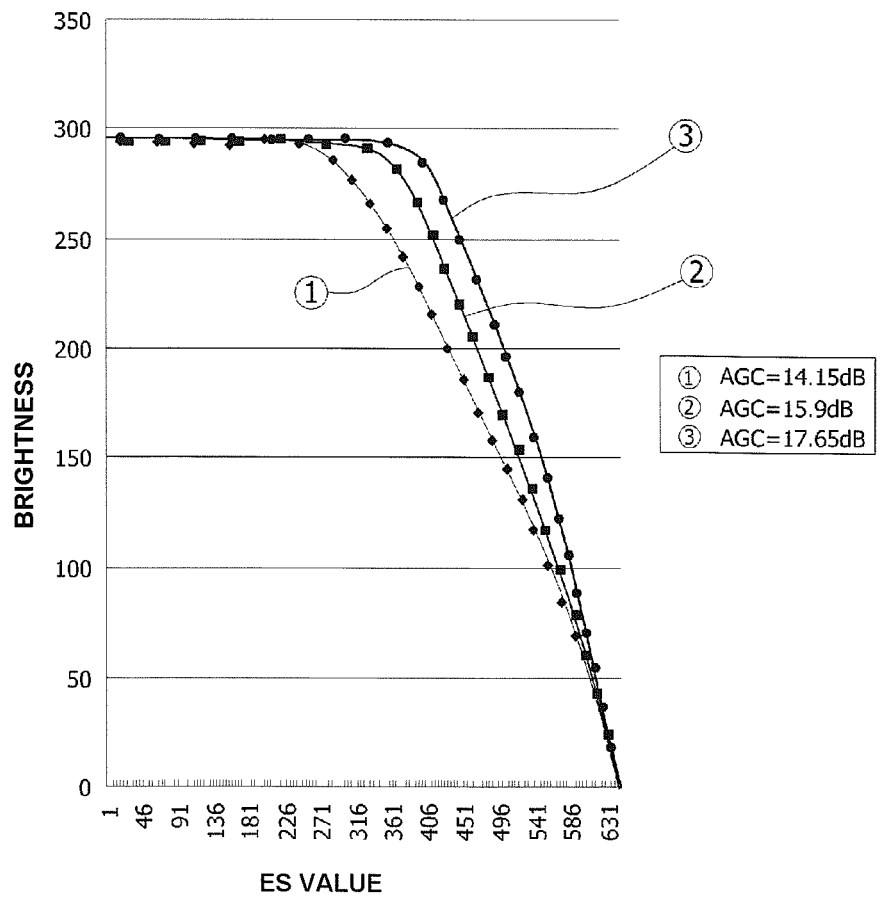
FIG. 5 is a graph illustrating a brightness value of an image frame with respect to an AGC value and an ES value.

FIG. 5 is a graph illustrating a brightness value of an image frame with respect to an AGC value and an ES value. Line (1) represents when AGC is about 14.15 dB, line (2) represents when AGC is about 15.9 dB, and line (3) represents when AGC is about 17.65 dB.

Referring to FIG. 5, the brightness change value can be obtained using the AGC value and the ES value.

For example, the brightness value is about 210 when the AGC value is about 14.15 dB and the ES value is about 406 in a first frame. The brightness value is about 240 when the AGC value is about 15.9 dB and the ES value is about 406 in a second frame. The brightness value is about 270 when the AGC value is about 17.65 dB and the ES value is about 406 in a third frame. Here, since there is an increase of about 30 in the brightness value between the first frame and the second frame, $UD_{n-1}$ is 30. Since there is an increase of about 30 in the brightness value between the second frame and the third frame, UD, is 30. That is, if the present feedback value is 300, the final value CFD is 360 (=300+30+30).

In an embodiment, to apply Equation 3 to Equation 2, Equations 4 and 5 can be used, as shown below.

$$e_n = T - CFD_n, \quad (4)$$

where T represents a target brightness value.

$$e_{n-1} = T - CFD_{n-1} \quad (5)$$

Equations 4 and 5 can become Equations 6 and 7 as follows.

$$e_n = T - FD_n + \sum_{k=0}^{1} UD_{n-k} - \sum_{k=0}^{1} DD_{n-k} \quad (6)$$

$$e_n - 1 = T - FD_{n-1} + \sum_{k=1}^{2} UD_{n-k} - \sum_{k=1}^{2} DD_{n-k} \quad (7)$$

The deviation $e_n - e_{n-1}$ of a proportional term can be obtained using $e_n$ and $e_{n-1}$ through Equation 8 below.

$$\begin{aligned} e_n - e_{n-1} &= T - CFD_n - (T - CFD_{n-1}) \quad (8) \\ &= CFD_{n-1} - CFD_n \\ &= FD_{n-1} - FD_n - (UD_n - UD_{n-2}) + (DD_n - DD_{n-2}) \end{aligned}$$

If applying $e_n$ and $e_n - e_{n-1}$ into Equation 2, it becomes Equation 9 below.

$$\Delta MV_n = K_p[= FD_{n-1} - FD_n - (UD_n - UD_{n-2}) + (DD_n - DD_{n-2})] + \quad (9)$$

$$K_i \left[ T - \left( FD_n + \sum_{k=0}^{1} UD_{n-k} - \sum_{k=0}^{1} DD_{n-k} \right) \right]$$

Equation 9 is the final equation of a proportional integral control method according to an embodiment of the present invention when considering the frame delay variable.

When applying $\Delta MV$, in Equation 9 to Equation 1, the manipulated variables of the ES value and the AGC value can be calculated. Also the AE compensation of a camera module can be performed according to the calculated ES value and AGC value.

According to embodiments of the present invention, an AE controlling device and method can apply the proportional integral control method to the AE compensation in the camera module. The delay of the image frame feedback due to the image signal process can be considered. As a result, stability and speed can be enhanced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An automatic exposure (AE) controlling method, comprising:
    calculating, via a controller, an electric shutter (ES) value through a proportional integral control method;
    calculating, via the controller, an analog gain control (AGC) value through the proportional integral control method; and
    performing, via the controller, AE compensation on a present image frame using the calculated ES value and the calculated AGC value,
    wherein calculating the ES value and calculating the AGC value comprises using a feedback delay variable for compensation in feedback of a brightness value of an image frame, and
    wherein the feedback delay variable comprises a brightness change value including brightness chance expected value of an image frame between an image frame with an input brightness value and the present image frame, and a brightness change expected value of the present image frame.

2. The method according to claim 1, wherein for increasing a brightness value of a present image frame, performing the AE compensation comprises:
    applying the calculated ES value for the present image frame; and
    wherein when the calculated ES value for the present image frame provides a desirable image brightness for the AE compensation, the calculated AGC value for a previous image frame is used with the calculated ES value for the present image frame to perform the AE compensation, and
    wherein when the AE compensation required to provide the desirable image brightness exceeds an adjusting range of the calculated ES value, both the calculated ES value for the present image frame and the calculated AGC value for the present image frame are applied to perform the AE compensation.

3. The method according to claim 1, wherein for decreasing a brightness value of a present image frame, performing the AE compensation comprises:
    applying the calculated AGC value for the present image frame; and
    wherein when the calculated AGC value for the present image frame provides a desirable image brightness for the AE compensation, the calculated ES value for a previous image frame is used with the calculated AGC value for the present image frame to perform the AE compensation, and
    wherein when the AE compensation required to provide the desirable image brightness exceeds an adjusting range of the calculated AGC value, both the calculated ES value for the present image frame and the calculated AGC value for the present image frame are applied to perform the AE compensation.

4. The method according to claim 1, wherein the feedback delay variable comprises a brightness change value between the brightness value of the image frame and a present brightness value of the present image frame.

5. The method according to claim 4, wherein the brightness change value comprises a brightness change expected value of an intermediate image frame between the image frame with the brightness value and the present image frame, and a brightness change expected value of the present image frame.

6. The method according to claim 4, wherein the image frame with the brightness value is two frames before the present image frame.

7. The method according to claim 1, wherein the proportional integral control method comprises using manipulated ES value and AGC value variables, and wherein each manipulated ES value and AGC value variable is calculated using the following equation:

$$MV_n = MV_{n-1} + \Delta MV_n,$$

where $MV_n$ represents a present value of the manipulated variable, $MV_{n-1}$ represents a previous iteration value of the manipulated variable, and $\Delta MV_n$ represents a derivative of the present value of the manipulated variable.

8. The method according to claim 7, wherein $$\Delta MV_n = K_p(e_n - e_{n-1}) + K_i e_n,$$

where $K_p$ represents a proportional control constant, $K_i$ represents an integral control constant, $e_n$ represents a deviation of the present value of the manipulated variable, and $e_{n-1}$ represents a deviation of the previous iteration value of the manipulated variable.

9. The method according to claim 8, wherein a feedback delay variable is calculated using the following equation:

$$CFD_n = FD_n + \sum_{k=0}^{1} UD_{n-k} - \sum_{k=0}^{1} DD_{n-k},$$

where CFD represents a final feedback value, FD represents a present feedback value, UD represents a brightness change value when a frame brightness value increases, and DD represents a brightness change value when a frame brightness value decreases.

10. The method according to claim 9, wherein $$e_n = T - CFD_n,$$
$$e_{n-1} = T - CFD_{n-1},$$

and $$\Delta MV_n = K_p[ = FD_{n-1} - FD_n - (UD_n - UD_{n-2}) + (DD_n - DD_{n-2})] + K_i\left[T - FD_n + \sum_{k=0}^{1} UD_{n-k} - \sum_{k=0}^{1} DD_{n-k}\right]$$

where T represents a target brightness value, $e_n$ represents a deviation of the present value of the manipulated variable, $e_{n-1}$ represents the deviation of the previous iteration value of the manipulated variable, $K_p$ represents the proportional control constant, and $K_i$ represents the integral control constant.

11. An automatic exposure (AE) control device, comprising:
an image sensor to convert light intensity of an incident image into an analog image signal;
an analog front end (AFE) capable of receiving the analog image signal to convert the analog image signal into a digital image signal, and controlling operations of the image sensor; and
a controller capable of calculating an electric shutter (ES) value and an analog gain control (AGC) value using a proportional integral control method according to a brightness value of the digital image signal from the AFE, and capable of controlling an exposure time of the image sensor and an analog gain of the AFE using the calculated ES value and the calculated AGC value,
wherein the ES value and the AGC value are calculated using a feedback delay variable for compensation in feedback of an inputted brightness value of an inputted image frame, and
wherein the feedback delay variable comprises a brightness change value including a brightness than expected value of an image frame between an image frame with an input brightness value and the present image frame, and a brightness change expected value of the present image frame.

12. The device according to claim 11, wherein the controller is capable of writing the calculated ES value and the calculated AGC value in a register of the AFE.

13. The device according to claim 11, wherein for increasing a brightness value of a present image frame, the controller is capable of controlling the exposure time of the image sensor and the analog gain of the AFE by performing automatic exposure compensation, wherein the automatic exposure compensation comprises:
applying the calculated ES value for the present image frame; and
wherein when the calculated ES value for the present image frame provides a desirable image brightness for the AE compensation, the calculated AGC value for a previous image frame is used with the calculated ES value for the present image frame to perform the AE compensation, and
wherein when the AE compensation required to provide the desirable image brightness exceeds an adjusting range of the calculated ES value, both the calculated ES value for the present image frame and the calculated AGC value for the present image frame are applied to perform the AE compensation.

14. The device according to claim 11, wherein for decreasing a brightness value of a present image frame, the controller is capable of controlling the exposure time of the image sensor and the analog gain of the AFE by performing automatic exposure compensation, wherein the automatic exposure compensation comprises:
applying the calculated AGC value for the present image frame; and
wherein when the calculated AGC value for the present image frame provides a desirable image brightness for the AE compensation, the calculated ES value for a previous image frame is used with the calculated AGC value for the present image frame to perform the AE compensation, and
wherein when the AE compensation required to provide the desirable image brightness exceeds an adjusting range of the calculated AGC value, both the calculated ES value for the present image frame and the calculated AGC value for the present image frame are applied to perform the AE compensation.

15. The device according to claim 11, wherein the feedback delay variable comprises a brightness change value between the inputted brightness value of the inputted image frame and a present inputted brightness value of a present image frame.

16. The device according to claim 15, wherein the brightness change value comprises a brightness change expected value of an intermediate inputted image frame between the inputted image frame with the inputted brightness value and the present inputted image frame, and a brightness change expected value of the present inputted image frame.

17. The device according to claim 15, wherein the image frame with the inputted brightness value is two frames before the present inputted image frame.

18. An automatic exposure (AE) controlling method, comprising:
- calculating, via a controller, an electric shutter (ES) value through a proportional integral control method;
- calculating, via the controller, an analog gain control (AGC) value through the proportional integral control method; and
- performing, via the controller, AE compensation on a present image frame using the calculated ES value and the calculated AGC value,
- wherein calculating the ES value and calculating the AGC value comprises using a feedback delay variable for compensation in feedback of a brightness value of an image frame, and
- wherein the proportional integral control method comprises using manipulated ES value and AGC value variables, and wherein each manipulated ES value and AGC value variable is calculated using the following equation:

$$MV_n = MV_{n-1} + \Delta MV_n,$$

where $MV_n$ represents a present value of the manipulated variable, $MV_{n-1}$ represents a previous iteration value of the manipulated variable, and $\Delta MV_n$ represents a derivative of the present value of the manipulated variable.

19. The method according to claim 18, wherein the feedback delay variable comprises a brightness change value between the brightness value of the image frame and a present brightness value of the present image frame.

20. The method according to claim 19, wherein the brightness change value comprises a brightness change expected value of an intermediate image frame between the image frame with the brightness value and the present image frame, and a brightness change expected value of the present image frame.

21. The method according to claim 19, wherein the image frame with the brightness value is two frames before the present image frame.

22. The method according to claim 18, wherein $$\Delta MV_n = K_p(e_n - e_{n-1}) + K_i e_n,$$

where $K_p$ represents a proportional control constant, $K_i$ represents an integral control constant, $e_n$ represents a deviation of the present value of the manipulated variable, and $e_{n-1}$ represents a deviation of the previous iteration value of the manipulated variable.

23. The method according to claim 22, wherein a feedback delay variable is calculated using the following equation:

$$CFD_n = FD_n + \sum_{k=0}^{1} UD_{n-k} - \sum_{k=0}^{1} DD_{n-k},$$

where CFD represents a final feedback value, FD represents a present feedback value, UD represents a brightness change value when a frame brightness value increases, and DD represents a brightness change value when a frame brightness value decreases.

24. The method according to claim 23, wherein $$e_n = T - CFD_n,$$

$$e_{n-1} = T - CFD_{n-1},$$

and $$\Delta MV_n = K_p[FD_{n-1} - FD_n - (UD_n - UD_{n-2}) + (DD_n - DD_{n-2})] + K_i\left[T - FD_n + \sum_{k=0}^{1} UD_{n-k} - \sum_{k=0}^{1} DD_{n-k}\right]$$

where T represents a target brightness value, $e_n$ represents a deviation of the present value of the manipulated variable, $e_{n-1}$ represents the deviation of the previous iteration value of the manipulated variable, $K_p$ represents the proportional control constant, and $K_i$ represents the integral control constant.

* * * * *